United States Patent
Ito

(10) Patent No.: US 12,286,113 B2
(45) Date of Patent: Apr. 29, 2025

(54) CONTROL APPARATUS, CONTROL METHOD, AND PROGRAM

(71) Applicant: TOYOTA JIDOSHA KABUSHIKI KAISHA, Toyota (JP)

(72) Inventor: Yuma Ito, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 168 days.

(21) Appl. No.: 18/317,569

(22) Filed: May 15, 2023

(65) Prior Publication Data

US 2024/0001922 A1     Jan. 4, 2024

(30) Foreign Application Priority Data

Jun. 30, 2022    (JP) .................... 2022-105878

(51) Int. Cl.
*B60W 30/18*     (2012.01)
*B60Q 9/00*     (2006.01)
(Continued)

(52) U.S. Cl.
CPC ......... *B60W 30/18009* (2013.01); *B60Q 9/00* (2013.01); *B60T 7/12* (2013.01); *B60W 50/087* (2013.01); *B60W 50/14* (2013.01); *F16H 61/16* (2013.01); *B60T 2220/00* (2013.01); *B60W 2540/215* (2020.02);
(Continued)

(58) Field of Classification Search
CPC ......... B60W 30/18009; B60W 50/087; B60W 50/14; B60W 2540/215; B60W 2710/1005; B60W 2710/182; B60W 2710/188; B60Q 9/00; B60T 7/12; B60T 2220/00; F16H 61/16; F16H 63/483
See application file for complete search history.

(56) References Cited

U.S. PATENT DOCUMENTS 8,355,851 B2 *   1/2013   Inoue ............... B60W 30/18118
                                                 701/96
8,370,040 B2 *   2/2013   Inoue .................. B60W 10/184
                                                 701/84

(Continued)

FOREIGN PATENT DOCUMENTS

JP           5332491 B2     11/2013
JP       2020-199889 A     12/2020

*Primary Examiner* — Sizo B Vilakazi
(74) *Attorney, Agent, or Firm* — Sughrue Mion, PLLC

(57) ABSTRACT

Disclosed is a control apparatus for a stopped state holding apparatus which can be switched between a holding state for holding a vehicle in a stopped state and a cancelled state in which the holding state is cancelled. The control apparatus includes a detection section for detecting a manipulation state of an operation section manipulated by an operator to switch the stopped state holding apparatus to the holding state or the cancelled state, and a control section for controlling operation of the stopped state holding apparatus on the basis of the detected manipulation state. In the case where the detection section detects a particular manipulation state in which a manipulation of the operation section for switching the stopped state holding apparatus continues for a predetermined period of time or longer, the control section controls the operation of the stopped state holding apparatus irrespective of the particular manipulation state.

7 Claims, 4 Drawing Sheets

(51) Int. Cl.
*B60T 7/12* (2006.01)
*B60W 50/08* (2020.01)
*B60W 50/14* (2020.01)
*F16H 61/16* (2006.01)

(52) U.S. Cl.
CPC .............. *B60W 2710/1005* (2013.01); *B60W 2710/182* (2013.01); *B60W 2710/188* (2013.01)

(56) References Cited

U.S. PATENT DOCUMENTS

| | | | | |
|---|---|---|---|---|
| 8,417,430 | B2* | 4/2013 | Saeki | B60W 30/17 |
| | | | | 701/31.4 |
| 8,548,709 | B2* | 10/2013 | Morita | B60W 30/16 |
| | | | | 701/96 |
| 8,768,597 | B2* | 7/2014 | Kagawa | G08G 1/22 |
| | | | | 701/119 |
| 9,174,643 | B2* | 11/2015 | Aso | G08G 1/161 |
| 10,017,178 | B2* | 7/2018 | Morimoto | B60W 30/14 |
| 10,118,617 | B2* | 11/2018 | Urano | B60W 10/20 |
| 10,486,698 | B2* | 11/2019 | Masui | B60W 30/16 |
| 2010/0194185 | A1* | 8/2010 | Holzmacher | B60T 13/683 |
| | | | | 303/6.01 |
| 2017/0267255 | A1* | 9/2017 | Numazawa | B60W 50/082 |
| 2019/0295419 | A1* | 9/2019 | Tosa | G08G 1/048 |

* cited by examiner

CONTROL APPARATUS, CONTROL METHOD, AND PROGRAM

BACKGROUND OF THE INVENTION

Field of the Invention

The present disclosure relates to a control apparatus, a control method, and a program.

Description of the Related Art

In some cases, an electric parking brake apparatus and/or a parking lock apparatus is mounted on a vehicle so as to hold the vehicle in a stopped state (hereinafter these apparatuses may be referred to simply as "stopped state holding apparatuses"). For example, Japanese Patent No. 5332491 discloses a vehicle system which activates a stopped state holding apparatus, as a backup, when the time over which brake holding operation is executed by a hydraulic brake apparatus reaches a threshold time.

In general, the vehicle system gives priority to driver's operations over other considerations. Therefore, even when conditions for activating the stopped state holding apparatus as a backup are satisfied, the vehicle system does not activate the stopped state holding apparatus as a backup if an operation section of the stopped state holding apparatus has been manipulated to a cancellation position. However, the system cannot determine whether the manipulation of the operation section to the cancellation position has occurred as a result of a driver's operation or as a result of an external cause other than the driver's operation.

Specifically, in the case where an operation switch of the electric parking brake apparatus is maintained at its cancellation position because an occupant's personal belonging or the like is caught by the operation switch or an occupant other than the driver (for example, a child) maintains the operation switch at its cancellation position as an act of play, the system erroneously determines that the operation switch is maintained at its cancellation position by the driver, despite the operation switch being maintained at its cancellation position due to an external cause. Also, in the case where the shift lever of a shift operation apparatus has been moved from the home position to another shift position and is continuously held at that shift position as a result of a baggage or the like being hanged on the shift lever, the system erroneously determines that the shift lever has been moved as a result of a driver's operation, despite the shift lever having been moved due to an external cause. If the system deactivates the stopped state holding apparatus serving as a backup on the basis of the erroneous determination as described above, the vehicle may start to travel due to creeping, contrary to the driver's intention.

SUMMARY OF THE INVENTION

The present disclosure discloses a technique which has been achieved so as to solve the above-described problem. Namely, an object of the technique is to optimize operation of a stopped state holding apparatus.

A control apparatus (1, 10) of the present disclosure is used for a stopped state holding apparatus (55, 70) which can be switched between a holding state for holding a vehicle (SV) in a stopped state and a cancelled state in which the holding state is cancelled.

The control apparatus (1, 10) comprises:
a detection section (120) for detecting a manipulation state of an operation section (52, 72) which is manipulated by an operator so as to switch the stopped state holding apparatus (55, 70) to either of the holding state and the cancelled state; and
a control section (130) for controlling operation of the stopped state holding apparatus (55, 70) on the basis of the manipulation state detected by the detection section (120), wherein
in the case where the detection section (120) detects a particular manipulation state in which a manipulation of the operation section (52, 72) for switching the stopped state holding apparatus (55, 70) continues for a predetermined period of time or longer, the control section (130) controls the operation of the stopped state holding apparatus (55, 70) irrespective of the particular manipulation state.

A control method of the present disclosure is used for controlling a stopped state holding apparatus (55, 70) which can be switched between a holding state for holding a vehicle (SV) in a stopped state and a cancelled state in which the holding state is cancelled.

The method comprises the steps of:
detecting a manipulation state of an operation section (52, 72) which is manipulated by an operator so as to switch the stopped state holding apparatus (55, 70) to either of the holding state and the cancelled state;
controlling operation of the stopped state holding apparatus (55, 70) on the basis of the detected manipulation state; and
controlling the operation of the stopped state holding apparatus (55, 70) irrespective of a particular manipulation state when the particular manipulation state is detected, the particular manipulation state being a manipulation state in which a manipulation of the operation section (52, 72) for switching the stopped state holding apparatus (55, 70) continues for a predetermined period of time or longer.

A program of the present disclosure is used for a computer of a stopped state holding apparatus (55, 70) which can be switched between a holding state for holding a vehicle (SV) in a stopped state and a cancelled state in which the holding state is cancelled.

The program causes the computer to execute a process of:
detecting a manipulation state of an operation section (52, 72) which is manipulated by an operator so as to switch the stopped state holding apparatus (55, 70) to either of the holding state and the cancelled state;
controlling operation of the stopped state holding apparatus (55, 70) on the basis of the detected manipulation state; and
controlling the operation of the stopped state holding apparatus (55, 70) irrespective of a particular manipulation state when the particular manipulation state is detected, the particular manipulation state being a manipulation state in which a manipulation of the operation section (52, 72) for switching the stopped state holding apparatus (55, 70) continues for a predetermined period of time or longer.

By virtue of the above-described configuration, upon detection of a particular manipulation state in which a manipulation of the operation section (52, 72) for switching the stopped state holding apparatus (55, 70) continues for a predetermined period of time or longer, the control apparatus (1, 10) controls the operation of the stopped state holding apparatus (55, 70) irrespective of the manipulation state of the operation section (52, 72). As a result, even in a situation where the control apparatus (1, 10) cannot correctly interpret the driver's operation of the operation section (52, 72), the operation of the stopped state holding apparatus (55, 70) can be optimized.

In the above description, in order to facilitate understanding of the present invention, the constituent elements of the invention corresponding to those of an embodiment are accompanied by parenthesized reference numerals which are used in the embodiment; however, the constituent elements of the invention are not limited to those in the embodiment defined by the reference numerals.

DESCRIPTION OF THE PREFERRED EMBODIMENT

Figure 1:
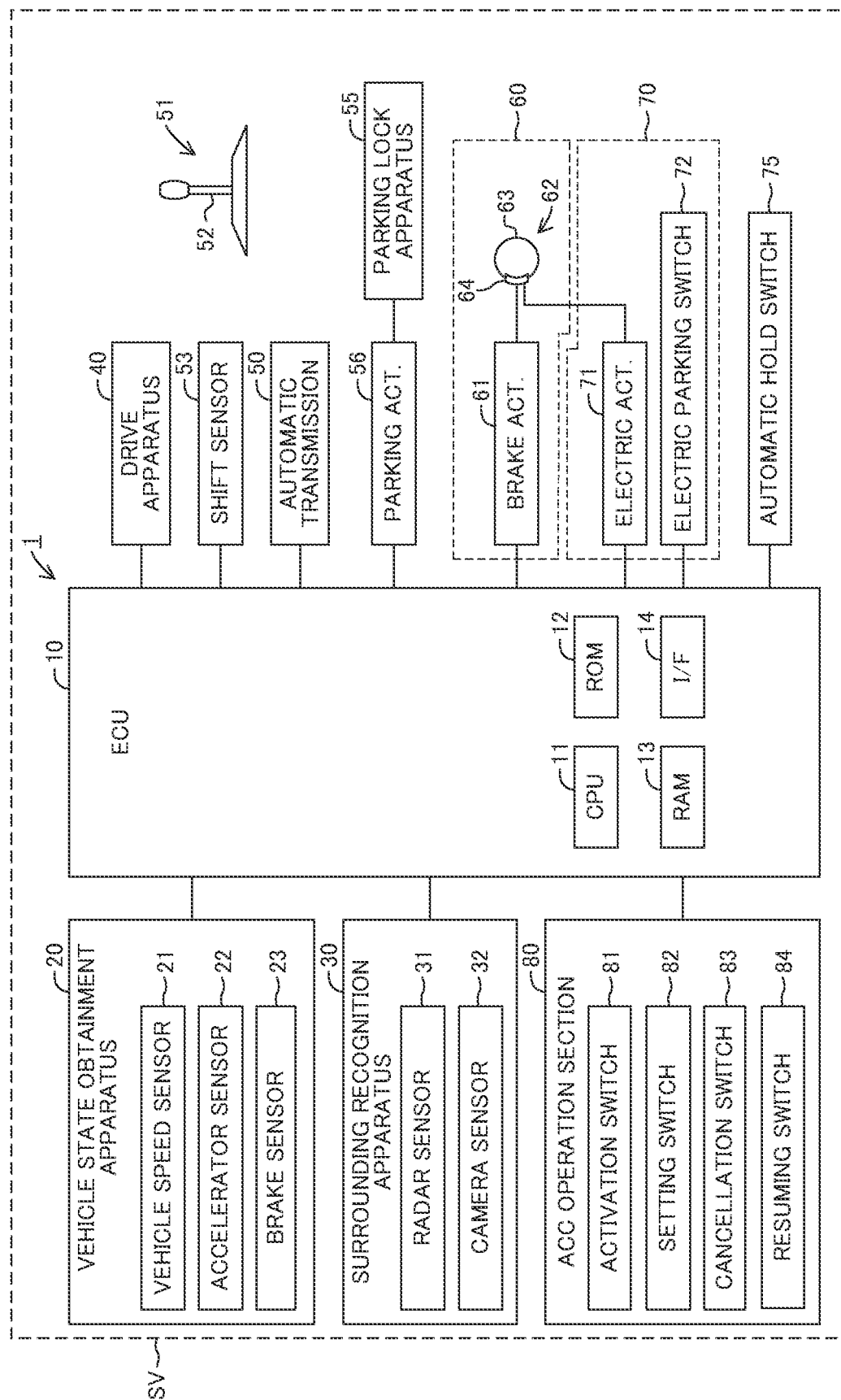
FIG. 1 is a diagram showing the hardware configuration of a control apparatus according to an embodiment.

A control apparatus, a control method, and a program according to an embodiment will now be described with reference to the drawings.
Hardware Configuration:

FIG. 1 is a diagram showing the hardware configuration of a control apparatus 1 according to the present embodiment. The control apparatus 1 is mounted on a vehicle SV. In the following description, the vehicle SV may be referred to as the own vehicle when the vehicle SV must be distinguished from other vehicles, etc.

The control apparatus 1 includes an ECU 10. The term "ECU" is an abbreviation for electronic control unit. The ECU 10 includes a CPU (central processing unit) 11, a ROM (read only memory) 12, a RAM (random access memory) 13, an interface unit 14, etc. The CPU 11 executes various programs stored in the ROM 12. The ROM 12 is a non-volatile memory and stores data, etc. which are necessary for the CPU 11 to execute the various programs. The RAM 13 is a volatile memory and provides a working space in which the various programs are developed when executed by the CPU 11. The interface unit 14 is a communication device for communications with external apparatuses.

The ECU 10 is a central unit which performs various controls for the vehicle SV. Therefore, a vehicle state obtainment apparatus 20, a surrounding recognition apparatus 30, a drive apparatus 40, an automatic transmission 50, a parking lock apparatus 55, a hydraulic brake apparatus 60, an electric parking brake apparatus 70, an ACC (adaptive cruise control) operation section 80, etc. are communicably connected to the ECU 10.

The vehicle state obtainment apparatus 20 is a group of sensors for obtaining the state of the vehicle SV. Specifically, the vehicle state obtainment apparatus 20 includes a vehicle speed sensor 21, an accelerator sensor 22, a brake sensor 23, etc.

The vehicle speed sensor 21 detects the travel speed of the vehicle SV (vehicle speed V) and transmits the detected vehicle speed V to the ECU 10. The vehicle speed sensor 21 may be a wheel speed sensor. The accelerator sensor 22 detects the amount of operation of an unillustrated accelerator pedal by a driver and transmits the detected accelerator pedal operation amount to the ECU 10. The brake sensor 23 detects the amount of operation of an unillustrated brake pedal by the driver and transmits the detected brake pedal operation amount to the ECU 10.

The surrounding recognition apparatus 30 is a group of sensors for recognizing pieces of object information regarding objects around the vehicle SV. Specifically, the surrounding recognition apparatus 30 includes a radar sensor 31, a camera sensor 32, etc. Examples of the pieces of object information include surrounding vehicles, traffic lights, white lines on roads, traffic signs, fallen objects, etc. The pieces of object information around the vehicle SV obtained by the surrounding recognition apparatus 30 are transmitted to the ECU 10.

The radar sensor 31 is provided, for example, at a front portion of the vehicle SV and detects an object present in a region ahead of the vehicle SV. The radar sensor 31 includes a millimeter wave radar and/or an LiDAR. The millimeter wave radar radiates a radio wave in the millimeter wave band (millimeter wave) and receives a millimeter wave (reflection wave) reflected by an object present in the region to which the millimeter wave is radiated. The millimeter wave radar obtains the relative distance Dr between the vehicle SV and the object, the relative speed Vr between the vehicle SV and the object, etc. on the basis of the phase difference between the transmitted millimeter wave and the received reflection wave, the level of attenuation of the reflection wave, the time elapsed until the reflection wave is received after the millimeter wave has been transmitted, etc. The LiDAR emits pulses of laser light having a wavelength shorter than that of the millimeter wave in different directions sequentially through scanning operation, and receives reflection light from an object, thereby obtaining the shape of the object detected ahead of the vehicle SV, the relative distance Dr between the vehicle SV and the object, the relative speed Vr between the vehicle SV and the object, etc.

The camera sensor 32 is, for example, a stereo camera or a monocular camera, and a digital camera including an image sensor such as a CMOS or a CCD can be used. The camera sensor 32 is disposed, for example, on an upper portion of a front windshield glass of the vehicle SV. The camera sensor 32 obtains image data by capturing an image of a scene ahead of the vehicle SV and processes the obtained image data, thereby obtaining a piece of information regarding an object located ahead of the vehicle SV (hereinafter referred to as the "object information") The object information is a piece of information which represents the type of the object detected ahead of the vehicle SV, the relative distance Dr between the vehicle SV and the object, the relative speed Vr between the vehicle SV and the object, etc. The type of the object may be recognized, for example, by machine learning such as pattern matching or the like.

The surrounding recognition apparatus 30 repeatedly transmits the obtained object information to the ECU 10 every time a predetermined time elapses. The ECU 10 determines the relative relation between the vehicle SV and the object by combining the relative relation between the vehicle SV and the object obtained by the radar sensor 31 and the relative relation between the vehicle SV and the object obtained by the camera sensor 32. Notably, the surrounding recognition apparatus 30 is not necessarily required to include both the radar sensor 31 and the camera sensor 32, and may include the radar sensor 31 only or the camera sensor 32 only.

The drive apparatus 40 generates drive power which is transmitted to drive wheels of the vehicle SV. Examples of the drive apparatus 40 include an engine and an electric motor. In the present embodiment, the vehicle SV may be a hybrid electric vehicle (HEV), a plug-in hybrid electric vehicle (PHEV), a fuel cell electric vehicle (FCEV), a battery electric vehicle (BEV), or an engine vehicle.

The automatic transmission 50 is disposed in a power transmission path between the drive apparatus 40 and the drive wheels. The automatic transmission 50 transmits the drive power output from the drive apparatus 40 to the drive wheels while reducing the speed at a predetermined reduction ratio. The automatic transmission 50 is, for example, a shift-by-wire-type automatic transmission and includes a shift operation apparatus 51, a shift sensor 53, etc.

The shift operation apparatus 51 is provided in a cabin of the vehicle SV (for example, a center console) and includes a shift lever 52 operated by a driver. The driver can select a desired shift position by operating the shift lever 52. For example, a parking position P, a reverse position R, a neutral position N, a drive position D, a home position H, etc. are set as shift positions of the shift operation apparatus 51.

in the present embodiment, the shift operation apparatus 51 is a momentary-type shift operation apparatus configured such that the shift lever 52 automatically returns to the home position H. Specifically, the shift lever 52 is located at the home position H when not operated. When the driver moves the shift lever 52 from the home position H to another shift position, the shift sensor 53 transmits a shift position signal indicating the selected shift position to the ECU 10. When the driver ends the operation of the shift lever 52; i.e., releases the shift lever 52, the shift lever 52 automatically returns to the home position H. Notably, the structure of the shift operation apparatus 51 is not limited to a structure in which the parking position P is selected by the shift lever 52, and the shift operation apparatus 51 may be configured such that the driver selects the parking position P by pressing a parking switch (not shown).

The parking lock apparatus 55 is one example of the stopped state holding apparatus of the present disclosure and is provided on the output side of the automatic transmission 50. The parking lock apparatus 55 includes a parking gear provided on a power transmission shaft (for example, the output shaft of the automatic transmission 50), a parking pole which can be engaged with the parking gear, a parking actuator 56 for moving the parking pole, etc.

Operation of the parking actuator 56 is controlled in accordance with an instruction from the ECU 10. Specifically, when the ECU 10 receives from the shift sensor 53 a shift position signal indicating the parking position P, the ECU 10 controls the operation of the parking actuator 56 such that the parking pole engages with the parking gear. When the parking pole engages with the parking gear, the power transmission shaft is fixed so as to establish a parking lock (the holding state of the present disclosure) in which rotation of the drive wheels is prevented. Meanwhile, in the case where, in a state in which the parking lock has been established, the shift lever 52 is moved from the parking position P to another shift position; i.e., the ECU 10 receives from the shift sensor 53 a shift position signal indicating a position other than the parking position P, the ECU 10 controls the operation of the parking actuator 56 so as to cancel the engagement of the parking pole with the parking gear. The reverse position R, the neutral position N, and the drive position D are examples of the cancellation position of the present disclosure.

The hydraulic brake apparatus 60 is, for example, a disc-type brake apparatus and applies braking forces to the wheels of the vehicle SV. The hydraulic brake apparatus 60 includes a brake actuator 61, brake mechanisms 62 provided for the wheels, etc. The brake actuator 61 is provided in a hydraulic circuit between a master cylinder (not shown) which pressurizes operating oil in accordance with a depressing force applied to the brake pedal and the brake mechanisms 62. Each brake mechanism 62 includes a brake disc 63 fixed to a wheel and a brake caliper 64 fixed to the body of the vehicle. The brake actuator 61 adjusts the pressure of oil supplied to a wheel cylinder built in the brake caliper 64 in accordance with an instruction from the ECU 10, whereby the wheel cylinder is operated by the oil pressure. Thus, the brake actuator 61 presses brake pads against the brake disc 63, thereby generating frictional braking force. Notably, the hydraulic brake apparatus 60 is not limited to the disc-type brake apparatus shown as an example and may be a drum-type brake apparatus or the like.

The electric parking brake apparatus 70 is one example of the stopped state holding apparatus of the present disclosure and includes an electric actuator 71, an electric parking switch 72, etc. The electric actuator 71 and the electric parking switch 72 are connected to the ECU 10. The electric parking switch 72 is a momentary-type switch whose operation section automatically returns to its neutral position and is provided in the cabin of the vehicle SV (for example, center console). In the electric parking switch 72, three positions are set; specifically, a neutral position at which the operation section is located when not operated, an ON position to which the operation section is pulled up from the neutral position, and an OFF position to which the operation section is pushed down from the neutral position. The OFF position is one example of the cancellation position of the present disclosure.

When the operation section is pulled up from the neutral position to the ON position, the electric parking switch 72 transmits an ON signal to the ECU 10. Upon reception of the ON signal from the electric parking switch 72, the ECU 10 controls the operation of the electric actuator 71 so as to press the brake pads against the brake discs 63. As a result, braking forces are applied to the rear wheels of the vehicle SV so as to establish an electric parking brake (the holding state of the present disclosure) in which the vehicle SV is maintained in a stopped state. Meanwhile, when the operation section is pushed down from the neutral position to the OFF position in a state in which the electric parking brake has been established, the electric parking switch 72 transmits an OFF signal to the ECU 10. Upon reception of the OFF signal from the electric parking switch 72 or a signal transmitted from the accelerator sensor 22 and indicating that the accelerator pedal has been depressed (accelerator ON signal), the ECU 10 controls the operation of the electric actuator 71 so as to cancel the pressing of the brake pads against the brake discs 63. As a result, the electric parking brake is cancelled.

The automatic hold switch 75 is a momentary-type ON/OFF switch and is provided in the cabin of the vehicle SV (for example, center console). When the vehicle SV stops in a state in which the automatic hold switch 75 is ON or when the automatic hold switch 75 is turned on in a state in which the vehicle SV is stopped, brake hold control of holding the oil pressures within the wheel cylinders of the hydraulic brake apparatus 60 is started. As a result, the driver can continuously maintain the vehicle SV in the stopped state without depressing the brake pedal. The brake hold control is cancelled when the driver turns off the automatic hold switch 75 or depresses the accelerator pedal. The brake hold control will be described in detail later.

The ACC operation section 80 is provided near the driver's seat (for example, steering wheel, steering column, etc.) and is a group of switches operated by the driver. The ACC operation section 80 includes an activation switch 81, a setting switch 82, a cancellation switch 83, a resuming switch 84, etc.

The activation switch 81 is an ON/OFF switch which allows the driver to start or end the ACC. The setting switch 82 is a switch for arbitrarily setting or changing a target vehicle speed Vtag and a target inter-vehicle distance Dtag (or target inter-vehicle time), within predetermined ranges, for the ACC. The target vehicle speed Vtag is a vehicle speed which the vehicle SV maintains when constant speed travel control (which will be described later) is executed. A lower limit speed (settable lowest speed) is provided for the target vehicle speed Vtag. The target inter-vehicle distance Dtag is an inter-vehicle distance which is provided between a preceding vehicle and the own vehicle at a vehicle speed V equal to or lower than the target vehicle speed Vtag when follow-up travel control (which will be described later) is executed.

The cancellation switch 83 is an ON/OFF switch for temporarily bringing the executed ACC into a cancelled state. When the driver turns on the cancellation switch 83 during execution of the ACC, the ACC is brought into the cancelled state. The resuming switch 84 is an ON/OFF switch for resuming the ACC in the cancelled state or restarting (starting) the ACC in a standby state.

Figure 2:
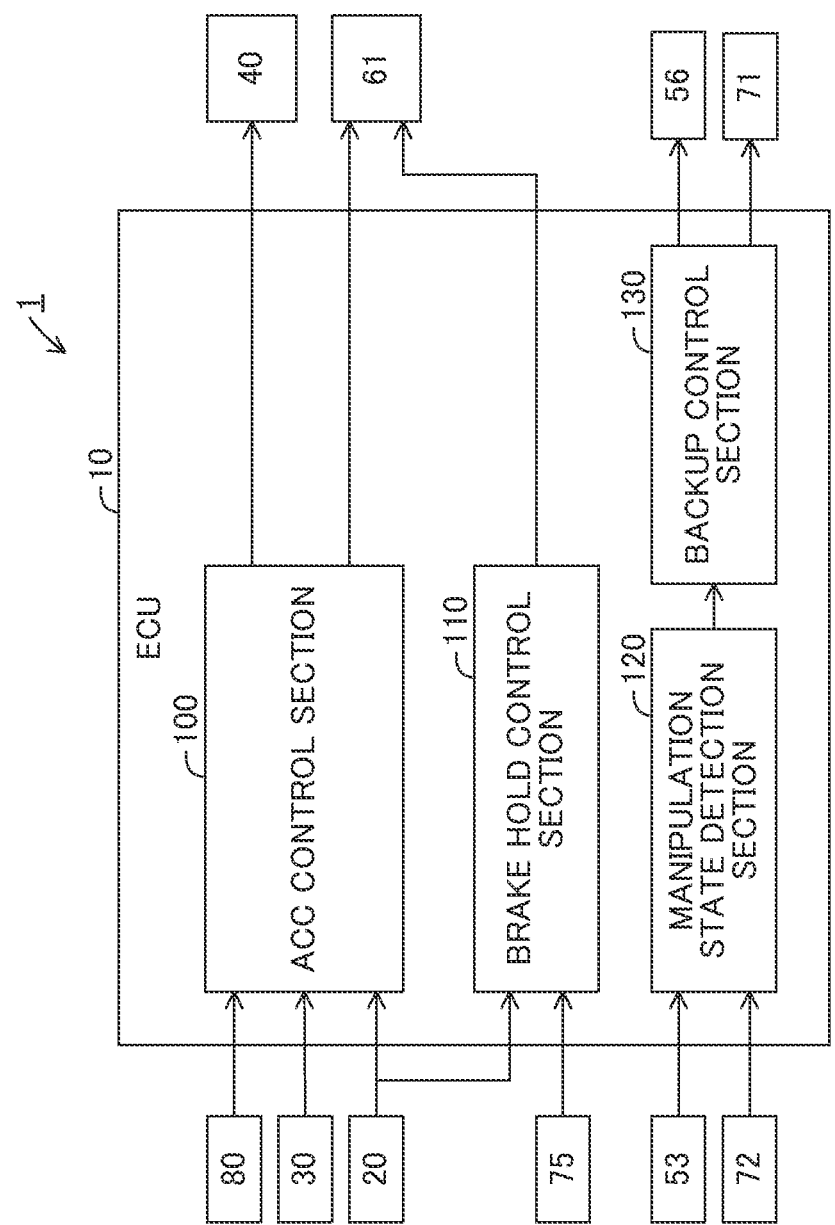
FIG. 2 is a diagram showing the software configuration of the control apparatus according to the embodiment.

Software Configuration:

FIG. 2 is a diagram showing the software configuration of the control apparatus 1 according to the present embodiment.

As shown in FIG. 2, the ECU 10 includes an ACC control section 100, a brake hold control section 110, a manipulation state detection section 120, and a backup control section 130 as functional elements. The CPU 11 of the ECU 10 realizes each of these functional elements 100 to 130 by reading a program stored in the ROM 12, loading the read program into the RAM 13, and executing the loaded program. Notably, the functional elements 100 to 130 will be described under the assumption that, in the present embodiment, the functional elements 100 to 130 are contained in the ECU 10, which is a single hardware unit. However, some of the functional elements 100 to 130 may be provided in another ECU different from the ECU 10. Alternatively, all or some of the functional elements 100 to 130 of the ECU 10 may be provided in an information processing apparatus of a facility (for example, a management center or the like) which can communicate with the vehicle SV.

The ACC control section 100 executes the ACC on the basis of the target vehicle speed Vtag and the target inter-vehicle distance Dtag. The ACC itself is well known (see, for example, Japanese Patent Application Laid-Open (kokai) No. 2014-148293, Japanese Patent Application Laid-Open (kokai) No. 2006-315491, Japanese Patent No. 4172434, Japanese Patent No. 4929777, etc.). Accordingly, the ACC will be briefly described below. The ACC contains two types of controls; i.e., constant speed travel control and follow-up travel control. The constant speed travel control causes the vehicle SV to travel at the target vehicle speed Vtag (constant speed) without needing driver's accelerator operation and brake operation. The follow-up travel control causes the own vehicle SV to follow a preceding vehicle such that the inter-vehicle distance between the preceding vehicle and the own vehicle SV is maintained at the target inter-vehicle distance Dtag, without needing driver's accelerator operation and brake operation. The preceding vehicle refers to a vehicle which travels immediately ahead of the own vehicle SV in a region in front of the own vehicle SV.

When the activation switch 81 of the ACC operation section 80 is turned on, the ACC control section 100 determines, on the basis of the object information contained in vehicle surrounding information, whether or not a preceding vehicle to follow is present. In the case where the ACC control section 100 determines that no preceding vehicle is present, the ACC control section 100 executes the constant speed travel control. In this case, the ACC control section 100 controls the drive apparatus 40 and controls the hydraulic brake apparatus 60 (61) when necessary such that the vehicle speed V coincides with the target vehicle speed Vtag. Meanwhile, in the case where the ACC control section 100 determines that a preceding vehicle is present, the ACC control section 100 executes the follow-up travel control. In this case, the ACC control section 100 controls the drive apparatus 40 and controls the hydraulic brake apparatus 60 (61) when necessary such that the inter-vehicle distance between the own vehicle SV and the preceding vehicle coincides with the target inter-vehicle distance Dtag.

When either of the following cancellation conditions (1) and (2) is satisfied, the ACC control section 100 temporarily brings the ACC into a cancelled state. The cancelled state refers to a state in which the ACC is interrupted in a state in which the set values of the target vehicle speed Vtag and the target inter-vehicle distance Dtag have been stored.

Cancellation condition (1): The driver turns on the cancellation switch 83 during execution of the ACC.

Cancellation condition (2): The driver depresses the brake pedal during execution of the ACC.

When the ACC is cancelled as a result of satisfaction of the cancellation condition (1) or the cancellation condition (2), the vehicle's travel mode changes from a driving assistance mode in which the constant speed travel control or the follow-up travel control is executed to a normal travel mode in which driving operation is entrusted to the driver. After the ACC control section 100 has cancelled the ACC upon satisfaction of the cancellation condition (1) or the cancellation condition (2), the driver may turn on the resuming switch 84 before the vehicle SV stops. In such a case, the ACC control section 100 resumes the ACC.

The ACC control section 100 brings the ACC into a standby state when any of the following standby conditions (1) to (3) is satisfied. The standby state refers to a state in which execution of the ACC is suspended, while the set values of the target vehicle speed Vtag and the target inter-vehicle distance Dtag (in the case of the standby condition (3), the lowest speed and a default target inter-vehicle distance) are stored, in a state in which the vehicle SV is stopped.

Standby condition (1): The own vehicle SV stops as a result of stoppage of the preceding vehicle during execution of the follow-up travel control.

Standby condition (2): The driver turns on the resuming switch 84 in a state in which the driver has caused the vehicle SV to stop after the ACC had been temporarily cancelled as a result of satisfaction of the cancellation condition (1) or (2).

Standby condition (3): The driver turns on the activation switch 81 in a state in which the activation switch 81 is OFF and the vehicle SV is stopped.

In relation to the standby condition (1), the automatic hold switch 75 may be ON or OFF. In relation to the standby conditions (2) and (3), in the case where the electric parking switch 72 is ON or the case where the shift sensor 53 detects the parking position P, the ACC is invalidated even when the driver turns on the resuming switch 84 or the activation switch 81. Namely, the ACC is not brought into the standby state, and priority is given to the operation of holding the stopped state (hereinafter referred to as "stopped state holding"). The ACC control section 100 brings the ACC into the standby state upon satisfaction of any of the standby conditions (1) to (3), and resumes the ACC (starts the ACC in the case of the standby condition (3)) when the driver turns on the resuming switch 84 or depresses the accelerator pedal.

When either of the following execution conditions (1) and (2) is satisfied, the brake hold control section 110 executes brake hold control of holding the oil pressures of the wheel cylinders of the hydraulic brake apparatus 60, thereby continuously holding the stopped state of the vehicle SV.

Execution condition (1): The vehicle SV is stopped and the automatic hold switch 75 is ON.

Execution condition (2): The ACC is brought into the standby state as a result of satisfaction of any of the standby conditions (1) to (3).

Notably, in order to prevent the driver from getting off the vehicle during the brake hold, the execution conditions (1) and (2) are desirably on the premise that the door for the driver's seat is closed and the driver has fastened his/her seat belt.

When any of the following end conditions (1) to (3) is satisfied, the brake hold control section 110 ends the brake hold control; namely, cancels the operation of holding the oil pressure of the hydraulic brake apparatus 60.

End condition (1): After the brake hold control has been started as a result of satisfaction of the execution condition (1), the driver performs a cancellation operation; i.e., the driver turns off the automatic hold switch 75 in a state in which the brake pedal is depressed, or the driver depresses the accelerator pedal.

End condition (2): After the brake hold control has been started as a result of satisfaction of the execution condition (2), the driver performs a cancellation operation (namely, an ACC resuming or starting operation); i.e., the driver turns on the resuming switch 84 or depresses the accelerator pedal.

End condition (3): After the brake hold control has been started as a result of satisfaction of the execution condition (1) or (2), the time during which the brake hold control has been executed (hereinafter referred to as the "brake hold control execution time") reaches a predetermined threshold time T without the cancellation operation by the driver.

No particular limitation is imposed on the threshold time T of the end condition (3), and the threshold time T may be appropriately set in consideration of the specifications, performances, etc. of the vehicle SV and the hydraulic brake apparatus 60.

The manipulation state detection section 120 detects the manipulation state of the electric parking switch 72 (the position of the operation section) on the basis of the ON/OFF signal transmitted from the electric parking switch 72. Also, the manipulation state detection section 120 detects the manipulation state of the shift operation apparatus 51 (the position of the shift lever 52) on the basis of the shift position signal transmitted from the shift sensor 53. The manipulation state detection section 120 transmits these detected manipulation states to the backup control section 130 at predetermined intervals.

When the brake hold control execution time reaches the predetermined threshold time T, the backup control section 130 executes backup control of holding the vehicle SV in the stopped state by activating both or either of the electric parking brake apparatus 70 and the parking lock apparatus 55. As a result, the backup for holding the vehicle SV in the stopped state without fail even after the end of the brake hold control is established. The brake hold control may be ended after elapse of a predetermined time from the time when the stopped state holding by the backup control is established or simultaneously with the time when the stopped state holding by the backup control is established. When the backup control section 130 executes the backup control, the backup control section 130 executes a notification process for notifying the driver of the fact that the backup operates. The notification process may be performed by using a display apparatus (for example, a multi-information display) and/or a speaker.

Basically, the backup control section 130 determines whether to execute the backup control, while giving priority to driver's operation. Specifically, in the case where the operation section of the electric parking switch 72 is maintained at the neutral position; i.e., the manipulation state detection section 120 receives none of the ON signal and the OFF signal from the electric parking switch 72, during execution of the brake hold control, the driver does not perform an operation for intentionally deactivating the electric parking brake apparatus 70. Also, in the case where the shift lever 52 of the shift operation apparatus 51 is maintained at the home position H; i.e., the manipulation state detection section 120 receives a shift position signal indicating the home position H from the shift sensor 53, during execution of the brake hold control, the driver does not perform an operation for intentionally deactivating the parking lock apparatus 55. In the case where the manipulation state detection section 120 detects such a manipulation state, when the brake hold control execution time reaches the threshold time T, the backup control section 130 executes the backup control of activating the electric parking brake apparatus 70 or the parking lock apparatus 55.

Meanwhile, in the case where the operation section of the electric parking switch 72 is maintained at the OFF position or the shift lever 52 of the shift operation apparatus 51 is maintained at a shift position other than the home position H and the parking position P (for example, the drive position D) during execution of the brake hold control, conceivably, the driver performs the operation for intentionally deactivating the electric parking brake apparatus 70 or the parking lock apparatus 55. However, cases where these manipulation states are not based on the driver's intended operation are also conceivable.

Specifically, the following cases are conceivable. In one conceivable case, the operation section of the electric parking switch 72 is continuously pushed down to the OFF position, contrary to the driver's intention, as a result of an occupant's personal belonging being caught by the operation section, or as a result of an act of play by an occupant other than the driver (for example, a child). In another conceivable case, the shift lever 52 is moved from the home position H to another shift position and is continuously held at that shift position, contrary to the driver's intention, as a result of an occupant hanging a baggage on the shift lever 52, or as a result of the occupant other than the driver operating the shift lever 52 as an act of play. If the apparatus erroneously determines that such a state is based on the driver's operation and does not execute the backup control, the vehicle SV may start to travel due to creeping, contrary to the driver's intention.

In order to solve such a problem, the backup control section 130 of the present embodiment is configured such that, in the case where the manipulation state detection section 120 detects either of the following particular manipulation states (1) and (2) during execution of the brake hold control, the backup control section 130 determines that the current situation is not a situation where the driver's operation can be interpreted correctly and forcedly executes the backup control.

Particular manipulation state (1): The manipulation state detection section 120 has continuously received an OFF signal from the electric parking switch 72 for a predetermined period of time or longer; namely, the operation section of the electric parking switch 72 has been continuously maintained at its OFF position for the predetermined period of time or longer.

Particular manipulation state (2): The manipulation state detection section 120 has continuously received a shift position signal from the shift sensor 53 for a predetermined period of time or longer, the shift position signal indicating a shift position other than the home position H; namely, the shift lever 52 of the shift operation apparatus 51 has been located at a shift position other than the home position H for the predetermined period of time or longer.

In the case where the manipulation state detection section 120 detects the particular manipulation state (1) during execution of the brake hold control, even when the operation section of the electric parking switch 72 is maintained at the OFF position, the backup control section 130 executes the backup control which forcedly activates the electric parking brake apparatus 70. Also, in the case where the manipulation state detection section 120 detects the particular manipulation state (2) during execution of the brake hold control, even when the shift lever 52 has been moved to a shift position other than the home position H (for example, the drive position D), the backup control section 130 executes the backup control which forcedly activates the parking lock apparatus 55. As a result, even in the case the current situation is not a situation where the driver's operation can be interpreted correctly, the backup control is executed without fail. Thus, it becomes possible to effectively prevent starting of the vehicle SV which is not intended by the driver.

Next, a process routine for the brake hold control and the backup control, which is performed by the ECU 10, will be described with reference to the flowchart shown in FIG. 3.

In step S100, the ECU 10 determines, on the basis of the result of detection by the vehicle speed sensor 21, whether or not the vehicle SV has stopped. In the case where the vehicle SV has stopped (Yes), the ECU 10 proceeds to step S105. Meanwhile, in the case where the vehicle SV has not stopped (No), the ECU 10 repeats the determination of step S100.

In step S105, the ECU 10 determines whether or not either of the brake hold control execution conditions (1) and (2) is satisfied. The execution condition (1) is satisfied when the vehicle SV has stopped and the automatic hold switch 75 is ON. The execution condition (2) is satisfied when the ACC is brought into the standby state as a result of satisfaction of any of the standby conditions (1) to (3). In the case where either of the brake hold control execution conditions (1) and (2) is satisfied (Yes), the ECU 10 proceeds to step S110.

Meanwhile, in the case where none of the brake hold control execution conditions (1) and (2) is satisfied (No), the ECU 10 returns to step S100.

In step S110, the ECU 10 executes the brake hold control, which holds the oil pressures of the wheel cylinders of the hydraulic brake apparatus 60, thereby continuously holding the vehicle SV in the stopped state.

Next, in step S120, the ECU 10 determines whether or not the driver has performed a cancellation operation for cancelling the brake hold control; specifically, whether or not either of the end conditions (1) and (2) for ending the brake hold control is satisfied. The end condition (1) is satisfied when, after the brake hold control has been started upon satisfaction of the execution condition (1), the driver performs a cancellation operation; i.e., the driver turns off the automatic hold switch 75 in a state in which the driver has depressed the brake pedal, or the driver depresses the accelerator pedal. The end condition (2) is satisfied when, after the brake hold control has been started upon satisfaction of the execution condition (2), the driver performs a cancellation operation (an ACC starting or resuming operation); i.e., the driver turns on the resuming switch 84 or depresses the accelerator pedal. In the case where the driver has performed the cancellation operation (Yes), the ECU 10 proceeds to step S170 and ends the brake hold control by cancelling the operation of holding the oil pressures of the hydraulic brake apparatus 60. Meanwhile, in the case where the driver has not performed the cancellation operation (No), the ECU 10 proceeds to step S130.

In step S130, the ECU 10 determines whether or not the driver's operation can be correctly interpreted in the current situation; specifically, whether or not the manipulation state detection section 120 detects at least one of the particular manipulation states (1) and (2). The particular manipulation state (1) is a manipulation state in which the manipulation state detection section 120 continuously receives an OFF signal from the electric parking switch 72 for a predetermined period of time or longer. The particular manipulation state (2) is a manipulation state in which the manipulation state detection section 120 continuously receives a shift position signal from the shift sensor 53 for a predetermined period of time or longer, the shift position signal indicating a shift position other than the home position H. In the case where the manipulation state detection section 120 detects none of the particular manipulation states (1) and (2) (No); namely, the driver's operation can be correctly interpreted, the ECU 10 proceeds to step S140.

In step S140, the ECU 10 determines whether or not the execution time of the brake hold control started in step S110 has reached the threshold time T. In the case where the brake hold control execution time has not yet reached the threshold time T (No), the ECU 10 returns to step S110 and continues the brake hold control. Meanwhile, in the case where the brake hold control execution time has reached the threshold time T (Yes), the ECU 10 proceeds to the step S145.

In step S145, the ECU 10 executes a notification process for notifying the driver of the fact that the backup operates. Subsequently, in step S150, the ECU 10 determines whether or not the driver has intentionally performed a stopped state holding cancellation operation for cancelling the electric parking brake apparatus 70 and/or the parking lock apparatus 55. Examples of the stopped state holding cancellation operation include the following cancellation operations (1) to (3).

Cancellation operation (1): The driver manipulates the operation section of the electric parking switch 72 to its OFF position, while depressing the brake pedal.

Cancellation operation (2): The driver moves the shift lever 52 from the home position H to another shift position (for example, the drive position D) other than the parking position P, while depressing the brake pedal.

Cancellation operation (3): The driver has performed an operation which intends to cancel the electric parking brake apparatus 70, by depressing the accelerator pedal, in a state in which the driver has fastened his/her seat belt.

In the case where the driver has performed any of the cancellation operations (1) to (3) (Yes), the ECU 10 proceeds to step S170 and ends the brake hold control. Meanwhile, in the case where the driver has performed none of the cancellation operations (1) to (3) (No), the ECU 10 proceeds to step S160 and performs the backup control of activating the electric parking brake apparatus 70 and/or the parking lock apparatus 55.

In the case where the ECU 10 makes a positive determination (Yes) in step S130; namely, the manipulation state detection section 120 detects at least one of the particular manipulation states (1) and (2), the ECU 10 determines that the driver's operation cannot be correctly interpreted and proceeds to step S160.

In step S160, the ECU 10 performs the backup control of activating the electric parking brake apparatus 70 and/or the parking lock apparatus 55. Namely, in the case where the driver's operation cannot be correctly interpreted, the ECU 10 forcedly executes the backup control even when the brake hold control execution time has not yet reached the threshold time T. As a result, even in a situation where an manipulation which is not intended by the driver is applied to the electric parking switch 72 or the shift lever 52, the electric parking brake apparatus 70 and/or the parking lock apparatus 55 can be activated without fail as a backup, whereby safety can be enhanced.

After execution of the backup control in step S160, the ECU 10 proceeds to step S170. In the case where the ACC is in the standby state at that time, the ECU 10 ends the ACC. In step S170, the ECU 10 ends the brake hold control. After ending the brake hold control in step S170, the ECU 10 ends the current execution of the present routine (returns to the original routine). Notably, the backup control started in step S160 ends when the driver depresses the accelerator pedal in a state in which the driver has fastened his/her seat belt, or when the driver operates the electric parking switch 72 or the shift lever 52 so as to cancel the backup control, while depressing the brake pedal.

In the present embodiment having been described in detail above, in the case where, during execution of the brake hold control by the hydraulic brake apparatus 60, the manipulation state detection section 120 detects the particular manipulation state (1) in which an OFF signal is continuously received from the electric parking switch 72 for a predetermined period of time or longer, or the particular manipulation state (2) in which a shift position signal is continuously received from the shift sensor 53 for a predetermined period of time or longer, the shift position signal indicating a shift position other than the home position H, the backup control section 130 executes the backup control of activating the electric parking brake apparatus 70 and/or the parking lock apparatus 55, irrespective of these manipulation states. As a result, even in a situation where the driver's operation cannot be correctly interpreted (for example, a manipulation which is not intended by the driver is applied to the electric parking switch 72 or the shift lever 52), the electric parking brake apparatus 70 and/or the parking lock apparatus 55 can be activated without fail as a backup, whereby starting of the vehicle SV contrary to the driver's intention can be prevented effectively.

Although the control apparatus, the control method, and the program according to the present embodiment have been described, the present disclosure is not limited to the above-described embodiment, and various modifications can be made without departing from the object of the present invention.

Figure 3:
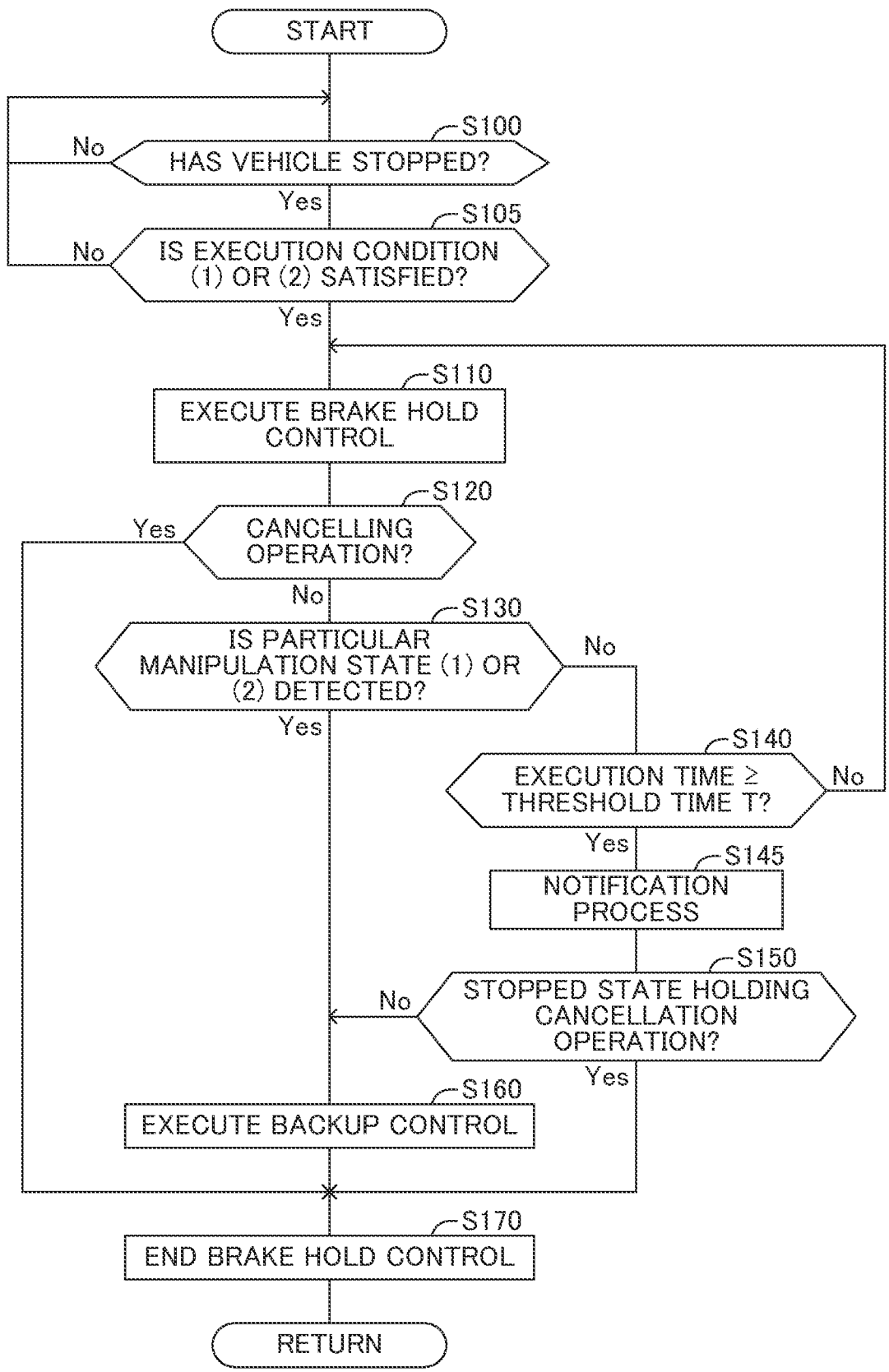
FIG. 3 is a flowchart used for describing a processing routine for brake hold control and backup control according to the embodiment.

Modifications:

In the flowchart shown in FIG. 3, the ECU 10 determines in step S130 whether or not either of the particular manipulation states (1) and (2) is detected and determines in step S140 whether or not the brake hold control execution time has reached the threshold time T. However, as shown in FIG. 4, the processing sequency of these steps; i.e., step S130 and step S140, can be changed.

The modification shown in FIG. 4 will now be described. Since the processing steps of the modification are identical with those of the flowchart shown in FIG. 3 except for steps S130 and S140, description of the identical processing steps will not be repeated.

Figure 4:
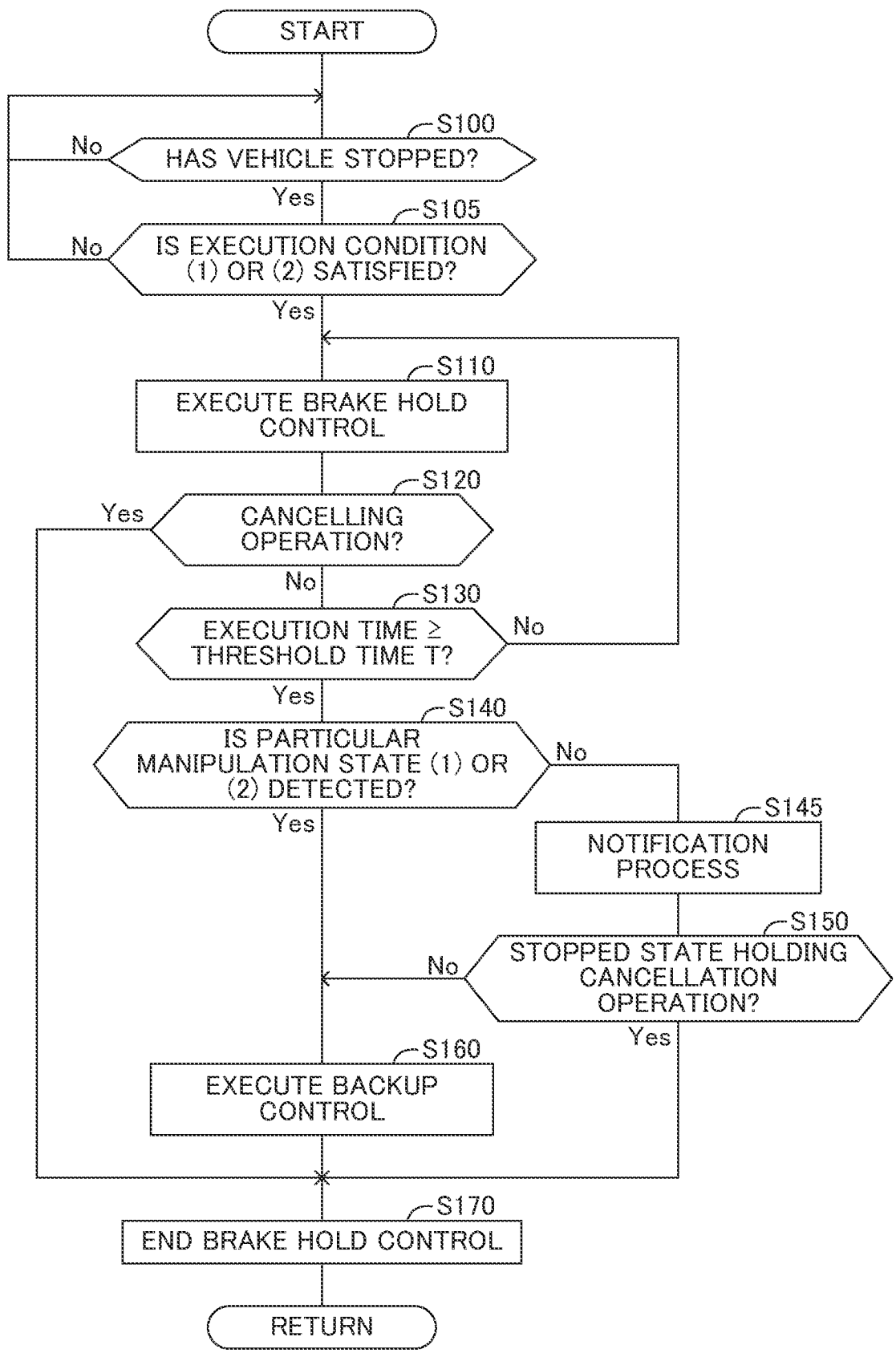
FIG. 4 is a flowchart used for describing a processing routine for brake hold control and backup control according to a modification.

As shown in FIG. 4, in step S130, the ECU 10 determines whether or not the brake hold control execution time has reached the threshold time T. In the case where the brake hold control execution time has reached the threshold time T (Yes), the ECU 10 proceeds to step S140. Meanwhile, in the case where the brake hold control execution time has not yet reached the threshold time T (No), the ECU 10 returns to step S110 and continues the brake hold control. In step S140, the ECU 10 determines whether or not the manipulation state detection section 120 detects at least one of the particular manipulation states (1) and (2). In the case where the manipulation state detection section 120 detects none of the particular manipulation states (1) and (2) (No), the ECU 10 proceeds to step S145. Meanwhile, in the case where the manipulation state detection section 120 detects at least one of the particular manipulation states (1) and (2) (Yes), the ECU 10 proceeds to step S160 and executes the backup control of activating the electric parking brake apparatus 70 and/or the parking lock apparatus 55.

Even in the case of the modification shown in FIG. 4, in the case where the driver's operation cannot be correctly interpreted when the brake hold control execution time has reached the threshold time T, the backup control of activating the electric parking brake apparatus 70 and/or the parking lock apparatus 55 is forcedly executed. Therefore, as in the case of the above-described embodiment, starting of the vehicle SV which is not intended by the driver can be prevented effectively.

In the above-described embodiment, the ECU 10 may execute a notification process of notifying the driver of a manipulation state when the manipulation state detection section 120 detects either of the particular manipulation states (1) and (2). The notification process may be performed by using both or either of display on a display unit and sound produced by a speaker. The notification process can appropriately notify the driver of the fact that the electric parking switch 71 or the shift lever 52 is in a manipulation state which is not intended by the driver.

The backup control of the above-described embodiment can be widely applied to backups of other types of stopped state holding control by the hydraulic brake apparatus 60 such as automatic stoppage control of automatically stopping the vehicle SV, for example, at an intersection whose traffic light is red, by automatic driving.

In the case where the driver performs an operation for starting the vehicle SV in a state in which the operation section of the electric parking switch 71 has been maintained at its ON position for a predetermined period of time, the ECU 10 may cancel the control of the electric parking brake apparatus 70 in accordance with the conditions around the own vehicle SV. In this case as well, it becomes possible to optimize the operation of the electric parking brake apparatus 70.

What is claimed is:

1. A control apparatus for a stopped state holding apparatus which can be switched between a holding state for holding a vehicle in a stopped state and a cancelled state in which the holding state is cancelled, the control apparatus comprising:
a detection section for detecting a manipulation state of an operation section which is manipulated by an operator so as to switch the stopped state holding apparatus to either of the holding state and the cancelled state; and
a control section for controlling operation of the stopped state holding apparatus on the basis of the manipulation state detected by the detection section, wherein
in the case where the detection section detects a particular manipulation state in which a manipulation of the operation section for switching the stopped state holding apparatus continues for a predetermined period of time or longer, the control section controls the operation of the stopped state holding apparatus irrespective of the particular manipulation state.

2. A control apparatus according to claim 1, wherein the particular manipulation state is a particular cancellation manipulation state in which a manipulation of the operation section for switching the stopped state holding apparatus to the cancelled state continues for a predetermined period of time or longer, and
wherein, in the case where the detection section detects the particular cancellation manipulation state during execution of brake hold control by a hydraulic brake apparatus mounted on the vehicle, the control section executes backup control of switching the stopped state holding apparatus to the holding state irrespective of the particular cancellation manipulation state.

3. A control apparatus according to claim 1, wherein, when the detection section detects the particular manipulation state, the control section executes a notification process for notifying an occupant of the vehicle of the state of the operation section.

4. A control apparatus according to claim 2, wherein the stopped state holding apparatus is an electric parking brake apparatus mounted on the vehicle,
the electric parking brake apparatus includes, as the operation section, an operation switch which automatically returns from at least its cancellation position to its neutral position, and
the particular manipulation state is a state in which the operation switch is continuously maintained at the cancellation position for a predetermined period of time or longer.

5. A control apparatus according to claim 2, wherein the stopped state holding apparatus is a parking lock apparatus provided in a shift-by-wire-type automatic transmission mounted on the vehicle,
the automatic transmission includes, as the operation section, a shift operation apparatus having a shift lever,
the shift operation apparatus has a home position to which the shift lever automatically returns, and
the particular manipulation state is a state in which the shift lever is continuously maintained at a shift position other than the home position for a predetermined period of time or longer.

6. A method for controlling a stopped state holding apparatus which can be switched between a holding state for holding a vehicle in a stopped state and a cancelled state in which the holding state is cancelled, the method comprising the steps of:
detecting a manipulation state of an operation section which is manipulated by an operator so as to switch the stopped state holding apparatus to either of the holding state and the cancelled state;
controlling operation of the stopped state holding apparatus on the basis of the detected manipulation state; and
controlling the operation of the stopped state holding apparatus irrespective of a particular manipulation state when the particular manipulation state is detected, the particular manipulation state being a manipulation state in which a manipulation of the operation section for switching the stopped state holding apparatus continues for a predetermined period of time or longer.

7. A program for a computer of a stopped state holding apparatus which can be switched between a holding state for holding a vehicle in a stopped state and a cancelled state in which the holding state is cancelled, the program causing the computer to execute a process of:
detecting a manipulation state of an operation section which is manipulated by an operator so as to switch the stopped state holding apparatus to either of the holding state and the cancelled state;
controlling operation of the stopped state holding apparatus on the basis of the detected manipulation state; and
controlling the operation of the stopped state holding apparatus irrespective of a particular manipulation state when the particular manipulation state is detected, the particular manipulation state being a manipulation state in which a manipulation of the operation section for switching the stopped state holding apparatus continues for a predetermined period of time or longer.

* * * * *